Sept. 4, 1945.　　　　G. G. OBERFELL　　　　2,384,258
CATALYST CHAMBER
Filed April 1, 1943
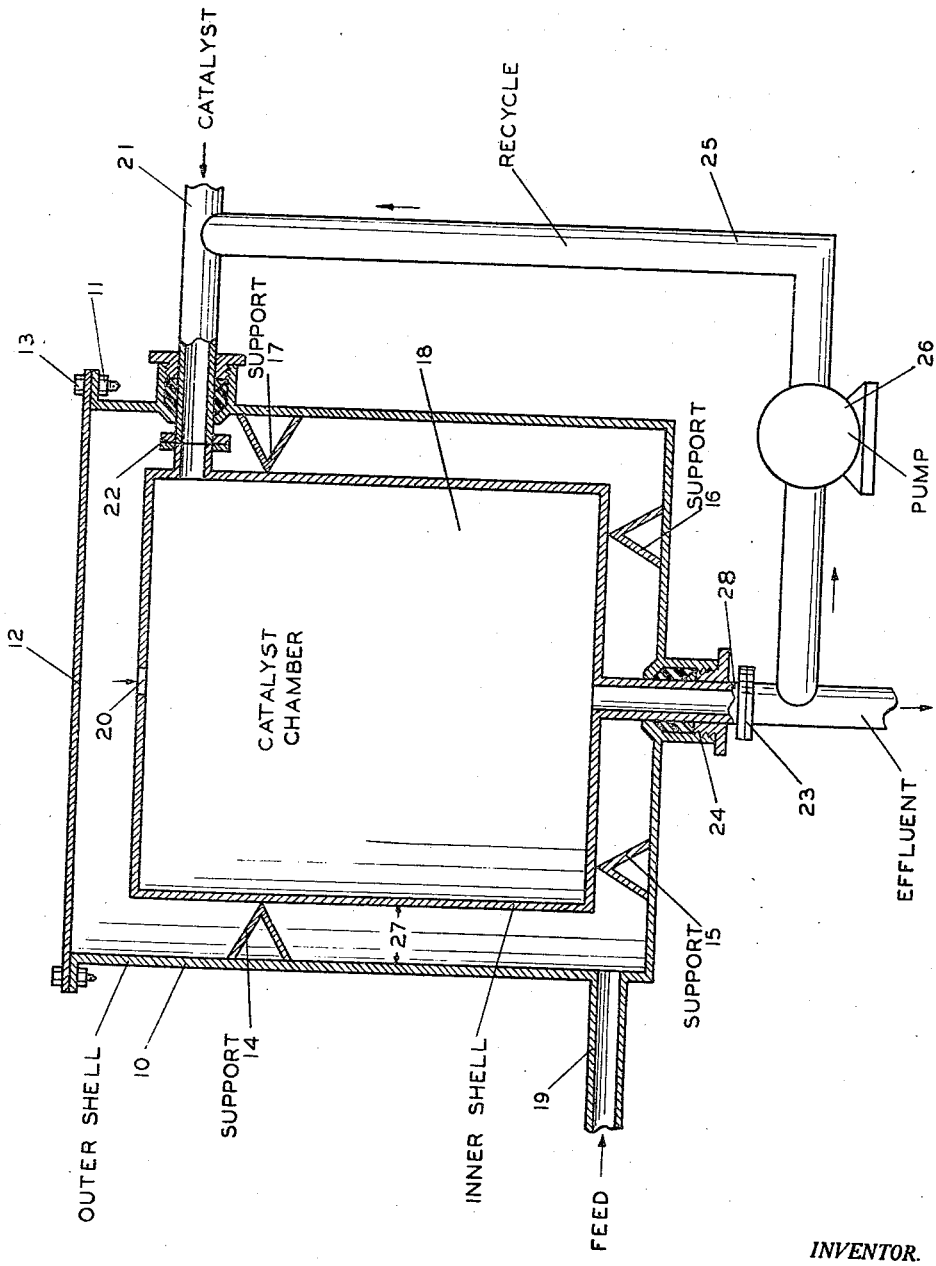
INVENTOR.
G.G. OBERFELL
BY
ATTORNEYS.

Patented Sept. 4, 1945

2,384,258

UNITED STATES PATENT OFFICE 2,384,258

CATALYST CHAMBER

George G. Oberfell, Bartlesville, Okla., assignor to Phillips Petroleum Company, a corporation of Delaware Application April 1, 1943, Serial No. 481,503

1 Claim. (Cl. 23—285)

This invention relates to apparatus wherein corrosive material such as aluminium chloride sludge is moved under conditions normally tending to effect corrosion or erosion of the apparatus. A preferred modification is a reaction chamber especially suitable for effecting hydrocarbon conversions such as isomerization or alkylation utilizing a mobile catalyst comprising aluminum chloride.

It has been found that aluminum chloride sludge, which may or may not contain free aluminum chloride, is very corrosive and/or erosive to most metals and other materials of construction when in motion. Many reactions are now carried out in which such sludge is circulated or otherwise moved through the apparatus and the corrosion problem has proved to be very serious. Even in cases in which such motion is very slow, for example, a slow dripping of sludge into the bottom of a catalyst chamber, a severe erosion may occur, causing premature failure of equipment.

It is an object of the invention to provide apparatus suitable for effecting hydrocarbon conversions utilizing a mobile catalyst of active sludges containing aluminum chloride or other active halides.

It is a further object of the invention to provide a catalyst chamber within a larger outer chamber, said inner catalyst chamber being replaceable when worn out.

It is a still further object of the invention to provide a replaceable catalyst chamber within a larger chamber containing the hydrocarbon to be treated, the pressure in the larger outer chamber being greater than the pressure in the catalyst chamber, so that flow is always into the catalyst chamber and the catalyst never touches the outer chamber. If a slight leak should occur in the catalyst chamber, it need not be replaced immediately since the flow is always into the catalyst chamber.

Additional objects, advantages and features of the invention will be apparent from the following description considered in conjunction with the accompanying drawing.

The figure of the drawing shows diagrammatically in vertical cross section the preferred embodiment of the invention.

The chamber comprises an outer shell 10 of any suitable material, such as steel, having a flange 11 around the upper edge thereof. A removable upper cover 12 completes the outer chamber and is bolted to the outer shell 10 through the flange 11 and bolts 13 with a suitable packing means between the top 12 and the flange 11. Supports 14, 15, 16 and 17 are attached to the outer shell 10 and hold the catalyst chamber 18 spaced from the outer shell 10. The outer shell 10 has a feed line 19 entering thereinto. The fluid flow enters the space 27 between the outer chamber 10 and the inner chamber 18 and enters into the catalyst chamber 18 through the opening 20 in the top of the inner chamber.

The catalyst enters the inner chamber 18 through the line 21, which line passes through the outer shell 10. In the space between the outer shell 10 and the inner catalyst chamber 18, the line 21 has the pipe joint 22, which allows the inner catalyst chamber to be disconnected from the line 21. The catalyst and cracked material leave the catalyst chamber 18 through the line 28 connecting into the bottom of the catalyst chamber 18. The line 28 has a pipe joint 23 which allows the line to be disconnected, so as to be able to remove the catalyst chamber 18 from the assembly when necessary. A suitable seal is provided at 24 between the line 28 and the outer shell 10. The effluent from the catalyst chamber is divided into two portions; one portion going to a separation treatment for removal of the hydrocarbon from the catalyst and the other portion as recycle. The recycle goes through line 25 and pump 26 and is finally mixed in with the catalyst coming in through line 21 from where it passes into the catalyst chamber 18.

In operation, feed which may be any hydrocarbon it is desired to treat, enters through the line 19 into the space 27 between the outer shell 10 and the catalyst chamber 18. The feed is entered into this space under sufficient pressure so that the pressure in the space 27 always exceeds the pressure in the catalyst chamber. The feed enters the catalyst chamber through the opening 20. The catalyst enters the chamber 18 through the line 21 and is a catalyst such as aluminum chloride which is very corrosive. The catalyst and feed meet in the catalyst chamber and the desired reaction takes place and the feed is converted to the product desired. The product and catalyst leave through the line 28 from where a portion of this effluent is returned to the catalyst chamber as recycle and the major portion of the effluent goes to separation.

The inner catalytic chamber may be constructed of a metal resistant to the corrosive effects of the catalyst but it is contemplated that the catalyst chamber will be made of a less expensive material, hence it will be subject to the corrosive action of the catalyst. If the chamber 18 becomes pitted or holes develop therein, it is not serious, since the pressure in space 27 is higher than the pressure in chamber 18, hence the flow is always into the catalyst chamber 18 and never out of the chamber. Therefore, the catalyst never contacts the outer shell 10 and the outer shell is not subject to the same corrosive action as the inner chamber 18. The chamber 18 is allowed to remain in operation, even though pitted, until the whole structure begins to disintegrate. The feed flows from the space 27 into the catalyst chamber through any pits in the side wall of the catalyst chamber 18. The feed may not be in contact with the catalyst for as long a period when the feed enters through pits or holes in the side wall of the catalyst chamber 18 but this feature is not of sufficient seriousness to affect the operations.

When the chamber 18 becomes thoroughly disintegrated and in need of replacement, the cover 12 is removed from the top of the outer shell 10 by removing the bolts 13. The pipe joint 22 is uncoupled after the cover 12 is removed and the joints 23 and 24 are uncoupled. This allows the chamber 18 to be removed from the outer shell and replaced. With a new chamber 18 in place on the supports 15 and 16 and spaced from the side walls of the outer shell 10 by the supports 14 and 17, the pipe joints 22 and 23 are assembled and the seal between the outer shell 10 and the pipe 28 is effected at 24. The cover 12 is put in place and the apparatus is again ready for operation.

The present invention has the advantage of not having to immediately replace a catalyst chamber which has become pitted. It conserves metal in that it gets a longer use out of the metal employed. It will be apparent that changes in the details of construction, and in the combination and arrangement of parts may be resorted to without departing from the spirit or scope of the invention as hereinafter claimed or sacrificing any of its advantages.

Having thus described my invention, what I claim is:

In apparatus of the character described, the combination comprising an outer chamber including a removable top wall, an inner chamber within the outer chamber, means wholly within the outer chamber for maintaining the inner chamber in predetermined spaced relation to the outer chamber, an inlet conduit for transmitting fluid material from the exterior of the outer chamber directly into the upper portion of the inner chamber, a discharge conduit establishing communication between the lower portion of the inner chamber and the exterior of the outer chamber, fluid inlet means in the inner chamber, a conduit independent of the aforesaid conduits for transmitting fluid from the exterior of the outer chamber into the space between the chambers, fluid so transmitted into the space being admitted into the inner chamber through said inlet means, and means including a conduit and a pump for conveying fluid material from the discharge conduit to the inlet conduit.

GEORGE G. OBERFELL.